MICHAEL CONNOLLY, OF NEWARK, NEW JERSEY.

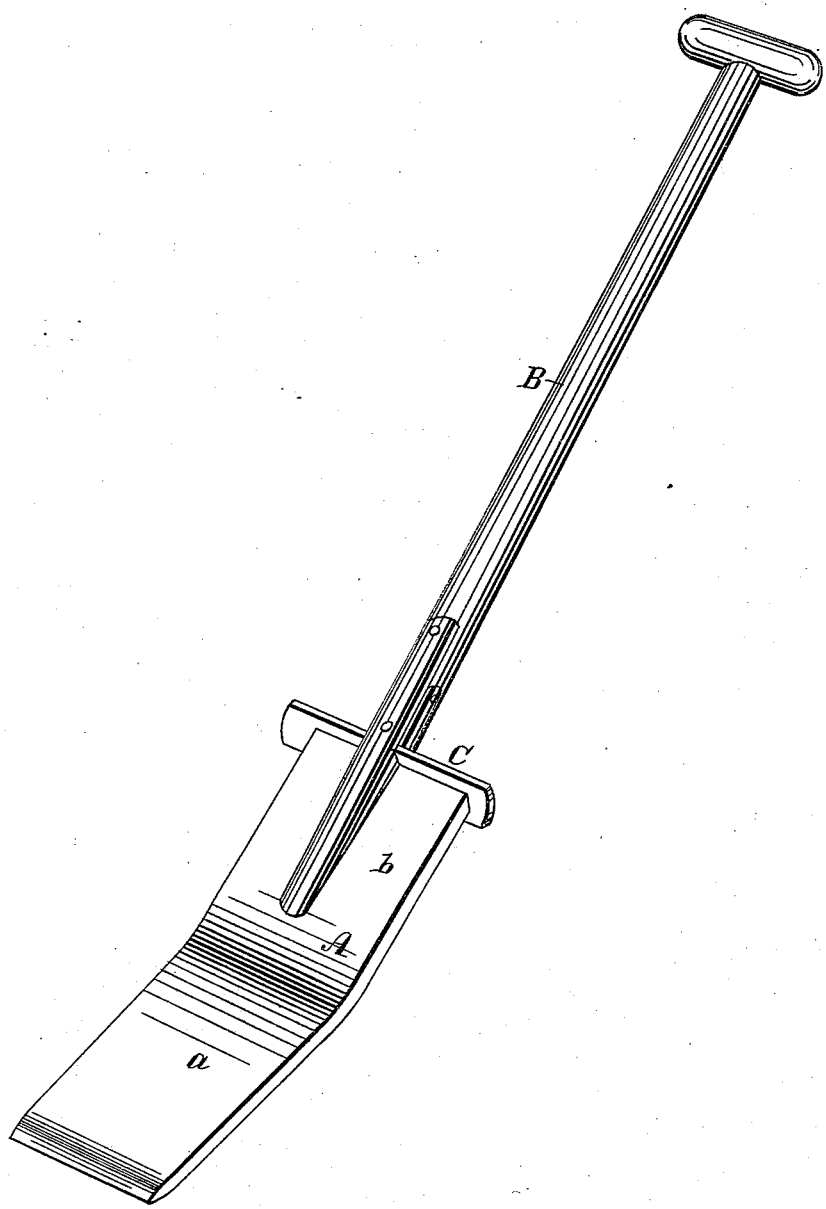

Letters Patent No. 84,797, dated December 8, 1868.

IMPROVEMENT IN SPADES.

The Schedule referred to in these Letters Patent and making part of the same.

*To all whom it may concern:*

Be it known that I, MICHAEL CONNOLLY, of Newark, in the county of Essex, and State of New Jersey, have invented a new and useful Improvement in Spades; and I do hereby declare that the following is a full, clear, and exact description thereof, which will enable others skilled in the art to make and use the same, reference being had to the accompanying drawings, forming part of this specification, in which the drawing represents a perspective view of my invention.

Similar letters of reference indicate like parts.

This invention relates to a new and improved spade; and

It consists in a peculiar construction of the same, as hereinafter fully shown and described, whereby the earth may be dug to a considerable depth, far deeper than with an ordinary spade, and with less labor.

A represents the blade of the spade, which is made much narrower than usual, and longer, and very much heavier or thicker, so as to be capable of being subjected to a prying action without any danger of being bent or broken.

The blade A is made with a bend or curve about at its centre, so that the lower part $a$ will form an obtuse angle with its upper part $b$, as clearly shown in the drawing.

The handle B of the spade is quite long, so that a person in using it will not be required to stoop, and the upper edge of the spade is provided with a broad foot-piece, $c$, to facilitate the forcing of the spade into the ground.

This spade, thus constructed, may be handled with the greatest facility, or with less labor than with the ordinary spade.

By having the long narrow blade bent, as shown, and the blade provided with a long handle, a good leverage-power is obtained in raising or prying up the earth, and the operator is not required to stoop in using the implement.

I am aware that spades have been constructed in curved form, and I therefore do not claim such; but having fully described my invention, What I do claim as new, and desire to secure by Letters Patent, is—

The described construction of the spade, consisting of the blade A, bent at its centre, so that the two parts $a$ $b$ shall form an obtuse angle with each other, and provided upon its upper end, next the handle, with the widened foot-rest C, as herein described for the purpose specified.

MICHAEL CONNOLLY.

Witnesses:
    J. J. McNAMARA,
    J. F. TOBIN.